US008511547B2

(12) United States Patent
Rans et al.

(10) Patent No.: US 8,511,547 B2
(45) Date of Patent: Aug. 20, 2013

(54) METHODS AND SYSTEMS FOR TWO-FACTOR AUTHENTICATION USING CONTACTLESS CHIP CARDS OR DEVICES AND MOBILE DEVICES OR DEDICATED PERSONAL READERS

(75) Inventors: Jean-Paul Edmond Rans, Glabais (BE); Paul Vanneste, Ottignies (BE)

(73) Assignee: MasterCard International Incorporated, Purchase, NY (US)

( * ) Notice: Subject to any disclaimer, the term of this patent is extended or adjusted under 35 U.S.C. 154(b) by 359 days.

(21) Appl. No.: 11/615,577

(22) Filed: Dec. 22, 2006

(65) Prior Publication Data
US 2007/0278291 A1 Dec. 6, 2007

Related U.S. Application Data

(60) Provisional application No. 60/753,311, filed on Dec. 22, 2005.

(51) Int. Cl.
*G06K 5/00* (2006.01)

(52) U.S. Cl.
USPC .......................................... 235/380; 235/492

(58) Field of Classification Search
USPC ........................................ 235/380, 451, 492
See application file for complete search history.

(56) References Cited

U.S. PATENT DOCUMENTS

| | | | |
|---|---|---|---|
| 6,325,285 B1 * | 12/2001 | Baratelli | 235/380 |
| 6,816,707 B1 | 11/2004 | Barker et al. | |
| 2002/0062284 A1 * | 5/2002 | Kawan | 705/43 |
| 2003/0055738 A1 * | 3/2003 | Alie | 705/26 |
| 2003/0163427 A1 | 8/2003 | Fung et al. | |
| 2003/0220096 A1 * | 11/2003 | Smeets | 455/410 |
| 2003/0221104 A1 | 11/2003 | Baessler | |
| 2004/0067750 A1 | 4/2004 | Engstrom et al. | |
| 2004/0127256 A1 * | 7/2004 | Goldthwaite et al. | 455/558 |
| 2004/0181463 A1 * | 9/2004 | Goldthwaite et al. | 705/26 |
| 2005/0108571 A1 | 5/2005 | Lu et al. | |
| 2005/0171905 A1 | 8/2005 | Wankmueller et al. | |
| 2005/0187882 A1 * | 8/2005 | Sovio et al. | 705/64 |
| 2006/0041746 A1 * | 2/2006 | Kirkup et al. | 713/168 |
| 2006/0186200 A1 * | 8/2006 | Nochta | 235/382 |

* cited by examiner

*Primary Examiner* — Daniel Hess
(74) *Attorney, Agent, or Firm* — Baker Botts L.L.P.

(57) ABSTRACT

Generating authentication data for use in a transaction by providing a contactless payment device or smart card configured to communicate with a mobile device, placing the contactless chip card in a proximity to the mobile device to instantiate communication between the contactless chip card and the mobile device, inputting a first input value into the mobile device, communicating data derived from the first input value from the mobile device to the contactless chip card, the contactless chip card converting a set of conversion data, including the first input value, into at least one dynamic value based at least in part on a secret value, communicating the dynamic value from the contactless chip card to the mobile device, and communicating authentication data based at least in part on the dynamic value to a user. In some embodiments the first input value is a Personal Identification Number (PIN), a challenge, or both a PIN and a challenge.

21 Claims, 6 Drawing Sheets

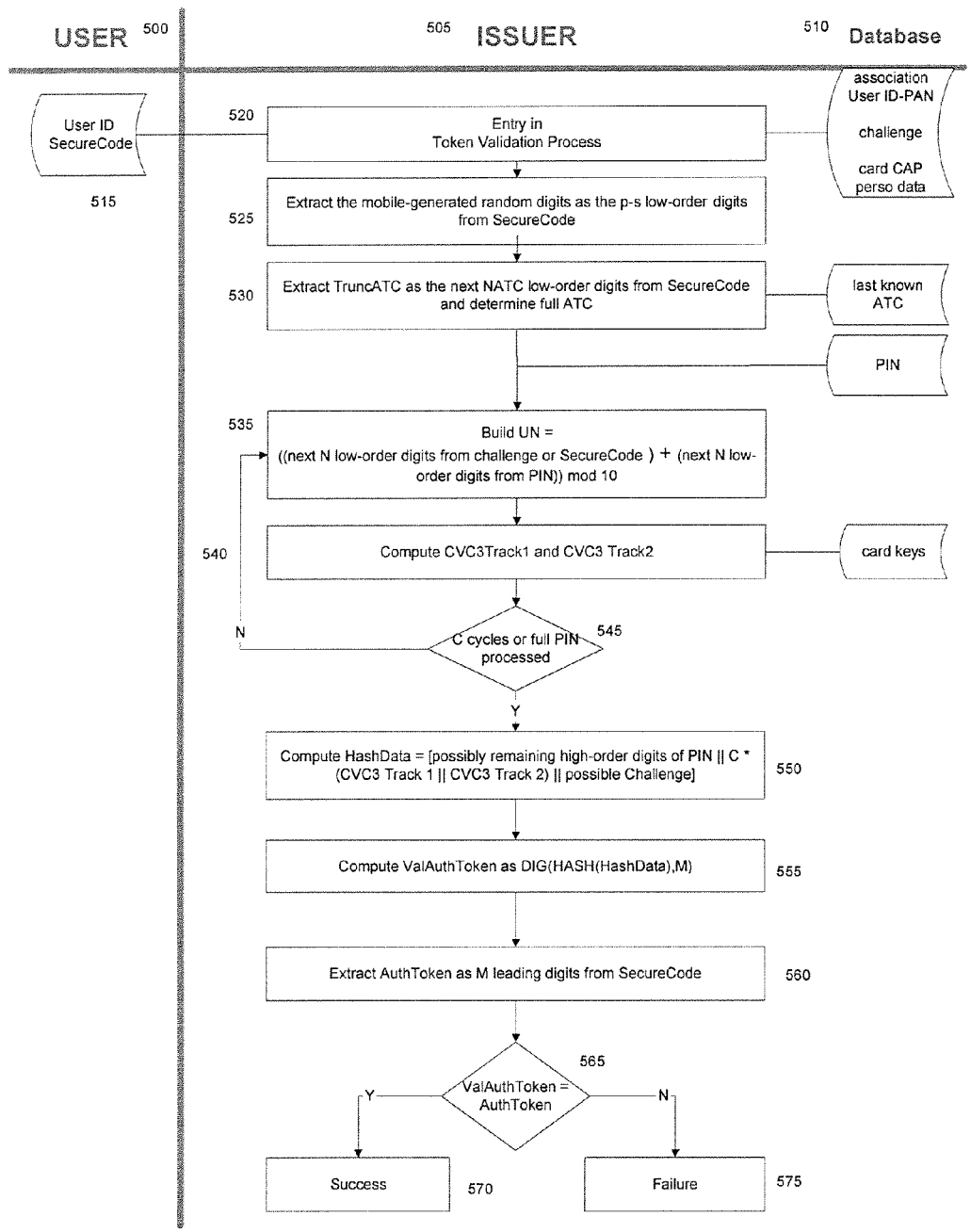

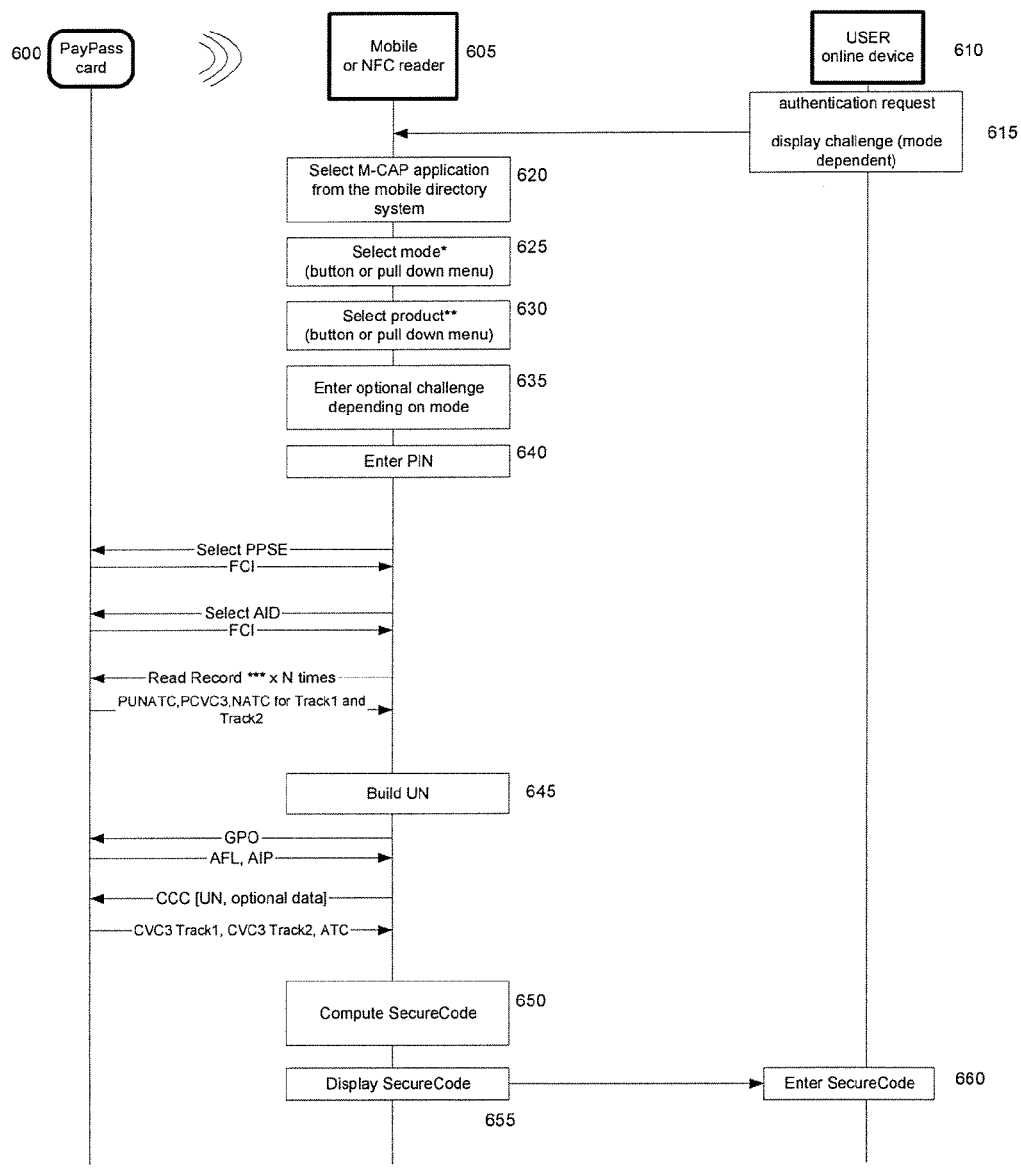

METHODS AND SYSTEMS FOR TWO-FACTOR AUTHENTICATION USING CONTACTLESS CHIP CARDS OR DEVICES AND MOBILE DEVICES OR DEDICATED PERSONAL READERS

RELATED APPLICATIONS

This application claims priority to U.S. provisional application 60/753,311, filed on Dec. 22, 2005, and entitled "Two-Factor Authentication Using Contactless Chip Cards and Mobile Devices," which is hereby incorporated by reference in its entirety.

BACKGROUND OF THE INVENTION

The use of credit and debit cards and payment devices, such as contactless payment devices and/or payment cards for transactions is ever increasing. Whether over the telephone, through the mail, at retail terminals, vending machines, or over the Internet, the need to perform transactions using payment devices is a common one. Such transactions offer the possibility of fraud, however, such as when a lost or stolen payment device is used by a wrongdoer to purchase goods or services. Fraud can be especially problematic in non-face-to-face transactions.

One approach to minimizing fraud is through the use of a payment device with an integrated circuit chip, such as a smart card. Often, these types of payment devices are used together with a secret code, password, or PIN known only to the card holder and the financial institution issuing the payment card. The combination of intelligent payment device and a PIN at the time of a transaction is commonly known as two-factor authentication. In this model, the payment device typically stores secret data, such as a cryptographic key, or key pair. The secret information is often stored in protected memory on the payment device, and is used during the transaction to create a cryptogram, digital signature, authentication code, or other data that can not be correctly generated without access to the secret data that is contained inside the payment device. Additionally, the PIN is used during the transaction and is verified before permitting the transaction. In this way, a transaction that includes data generated using the secret data on a payment device, and a valid PIN, is judged to be reasonably authentic because it involved a presumably authentic payment card and a person with access to a secret PIN.

In some situations, such as when performing an Internet transaction, it is not possible to validate a PIN at the time of the transaction because no terminal is available to enter the PIN, or in those situations where the PIN is validated by the payment device, there is no way to transmit the PIN into the payment device for verification. One technique to permit PIN verification in these situations is to turn a cell phone into a combined PIN entry device and payment device. In that technique, the cell phone may store both secret data, such as a cryptographic key, and secret PIN data. This technique is described in further detail in International Publication Number WO 2006/023839 A2, entitled "METHOD AND SYSTEM FOR AUTHORIZING A TRANSACTION USING A DYNAMIC AUTHORIZATION CODE" assigned to MasterCard International, Inc., and that publication is incorporated herein by reference in its entirety. In this approach, a payment application to be stored on a cell phone must be individually personalized for the particular account with which it is associated. Additionally, because cell phone memory may not be as secure as the memory associated with traditional intelligent payment devices, such as smart cards, special precautions must be made to prevent a secret key stored in the memory of the phone to be extracted and/or used to perform a fraudulent transaction.

BRIEF SUMMARY OF THE INVENTION

The present invention permits two-factor authentication using contactless chip cards or contactless payment devices, and contactless readers, such as mobile phones, dedicated personal contactless readers and the like.

One exemplary embodiment of the present invention entails a method of generating authentication data for use in a transaction comprising providing a contactless chip device having pre-stored secret data, configured to communicate with a mobile device; inputting a first input value into the mobile device; placing the contactless chip device in a proximity to the mobile device to instantiate communication between said contactless chip device and the mobile device; communicating data derived from the first input value from the mobile device to the contactless chip device; converting data derived from the first input value and the pre-stored secret data, into at least one dynamic value; communicating the dynamic value from the contactless chip device to the mobile device; and communicating authentication data based at least in part on the dynamic value to a user of the mobile device.

In another exemplary embodiment, a second input value is generated and communicated from the mobile device to the contactless device for use during the converting step.

In another exemplary embodiment, the contactless chip contains a transaction counter that is used during the converting step. The transaction counter may be incremented in response to the converting step.

In other exemplary embodiments, the first input value is a PIN or a challenge number.

In yet another exemplary embodiment, the authentication data communicated to the user contains a representation of all or a part of the transaction counter, the first input value, or the second input value.

Another exemplary embodiment entails a method of operating a mobile device, including operating the unit in a first mode of voice operation and a second mode for conducting a transaction, including receiving a first input value, communicating data derived from the first input value to a contactless chip device, receiving a dynamic value from the contactless chip device, and communicating the authentication data based on the dynamic value to a user.

Another exemplary embodiment entails a mobile device including a data entry device, a communication device for communicating with a contactless chip device; a display; and a processor programmed to receive a first input value from the data entry device; communicate date derived from the first input value to a contactless chip and receive a responsive dynamic value and communicating authenticate data based on the responsive dynamic value via the display. In another aspect of this embodiment, the mobile device includes a microphone and speaker to enable voice communications using the device.

BRIEF DESCRIPTION OF THE DRAWINGS

Further features of the disclosed subject matter will become apparent from the following detailed description taken in conjunction with the accompanying figures showing an embodiment of the invention of which:

FIG. 5 is a diagram of validating dynamic authentication data, e.g. a SecureCode, according to some embodiments of the disclosed subject matter.

FIG. 6 is a diagram of calculating dynamic authentication data, e.g. a SecureCode, according to some embodiments of the disclosed subject matter.

DETAILED DESCRIPTION

The disclosed subject matter is directed to methods and systems for two-factor authentication using contactless chip cards or devices and mobile devices. The disclosed subject matter allows for additional security in contactless chip device transactions by allowing a Personal Identification Number (PIN), a challenge, or some other input, to be entered into a mobile device. The mobile device can communicate with the contactless chip card or device in a variety of ways to transmit the PIN, challenge, or other input to the contactless chip device. The contactless chip card or device can take the input, and generate a dynamic output value. That output value can be returned to the mobile device which then formulates authentication data to either be displayed to the user or transmitted to the chip device issuer, authentication agent, or other entity involved in the transaction.

For convenience throughout this disclosure, the term "chip card" or "contactless chip card" may be used to refer to any type of payment device or token containing a processor, including smart card, key chain fob, contactless chip contained in a watch, wristband, or any other form factor known to persons of skill in the art.

Once the authentication data is received by the card issuer, authentication agent or other entity involved in the transaction, then a second authentication data can be generated. The second authentication data is based on data held by the card issuer, authentication agent or other entity involved in the transaction. If the second authentication data equals or in some other way is sufficiently similar to the authentication data submitted by the user or mobile device, then it is evidence that the transaction is being carried out by an authentic entity or individual with authority to authorize the transaction.

The contactless chip card can use a variety of variables in generating the dynamic value including a transaction counter that it stores internally, as well as an unpredictable number generated by the mobile device, or generated outside the mobile device, but is entered into the mobile device by a user of the unit. Moreover, the mobile device can append a variety of variables to the authentication data such as the unpredictable number, in whole or in part, and the challenge, in whole or in part. The issuer, authentication agent, or entity involved in the transaction can maintain data such as the PIN, the challenge, the unpredictable number, a synchronized transaction counter, or any other data that may be used to generate the second authentication data.

Figure 1:
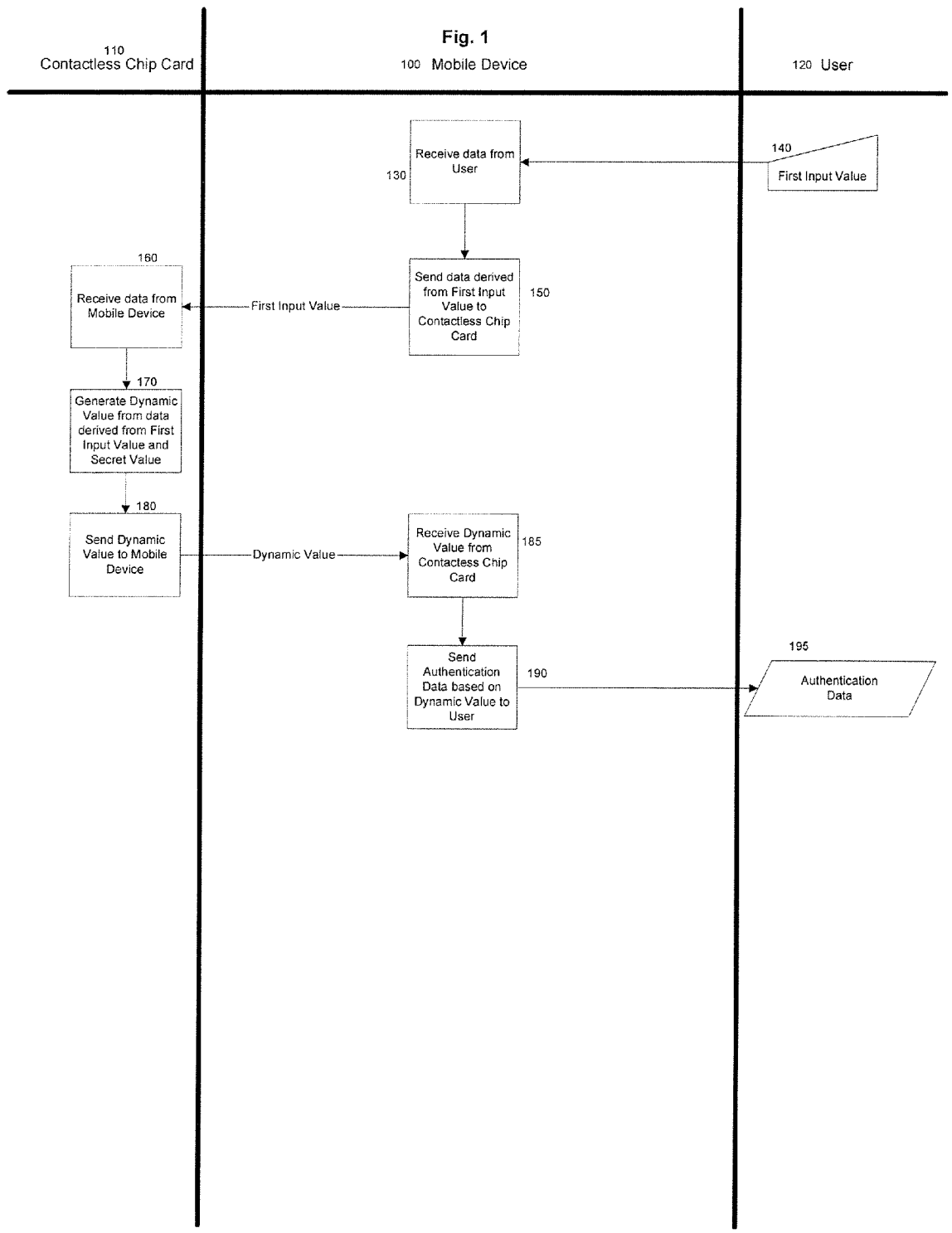
FIG. 1 is a diagram of calculating authentication data according to some embodiments of the disclosed subject matter.

FIG. 1 represents an embodiment of the method for generating authentication data for use in a transaction. A transaction can occur over the internet, at a merchant's location, in the context of e-commerce or e-banking, or in any other fashion in which a user would want to engage in a contactless card or device transaction. A mobile device 100 receives 130 a first input value 140 from a user 120. The mobile device 100 can be any mobile device such as a personal device, a calculator, a chip reader, a Personal Digital Assistant (PDA), a portable music player such as an MP3 Player, a mobile phone, or any other electronic device capable of communicating with a contactless chip device 110, using either Near Field Communication (NFC) or another protocol. In some embodiments, the first input value 140 is a Personal Identification Number (PIN). A PIN can be a number known only to the user 120 and the issuer. The PIN can also be a number known only to the user, where the issuer has a method of validating that PIN without storing it. In other embodiments the first input value 140 is a challenge number. The challenge number can be a random value provided to the user from a merchant, website, card issuer or any other participant in the transaction requiring the authentication data. In yet other embodiments, the first input value 140 is both a PIN and a challenge number.

In this embodiment, the mobile device 100 sends 150 the data derived from the first input value 140 to a contactless chip card 110.

The contactless chip card 110 can be a payment card, key chain, or any other token including an element capable of communicating contactlessly. The communication between the mobile device 100 and the contactless chip card can be via any wireless protocol, such as an IEEE 802.11, Bluetooth, ISO standards 14443, 15693, 18000 or similar Near Field Communication (NFC) or far field communication technology, or any other means of providing contactless communication between the mobile device 100 and the contactless chip card 110. Contactless communication is communication between two or more devices without a physical connection between the devices.

Figure 3:
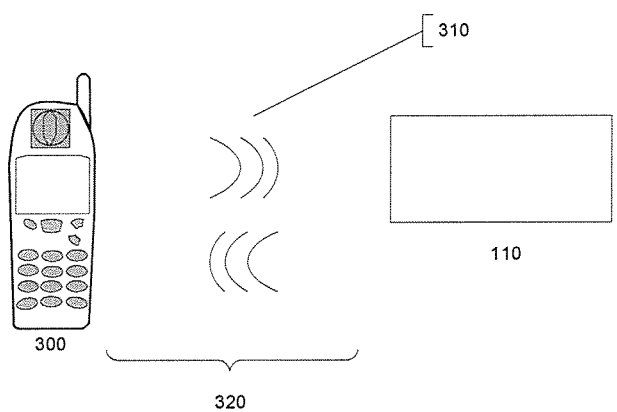
FIG. 3 is a diagram of a mobile device communicating with a contactless chip device.

In some embodiments, the communication between the contactless chip card 110 and the mobile device 100 can be initiated or instantiated by placing the contactless chip card 110 within sufficient proximity 320 to the mobile device 100 to allow for the communication, as demonstrated in FIG. 3. In some embodiments using Near Field Communication, the contactless chip card 110 cannot communicate with the mobile device 100 unless the contactless chip card 110 is within approximately 20 centimeters of the mobile device 100. In other embodiments, the communication between the contactless chip card 110 and the mobile device 100 can occur only for the time during which the contactless chip card 110 is in the pre-determined proximity to the mobile device 100. The proximity needed to facilitate contactless communication can depend on factors such as the technology used, the limits and requirements of any protocols, the power usage, interference, battery levels, or any other factor that could influence the ability for the contactless chip card 110 and the mobile device 100 to communicate.

Near Field Communication (NFC) is a technology standard developed and adopted by many technology companies in designing and manufacturing devices capable of contactless communication.

After receiving the first input data 140, the contactless chip card 110 generates 170 a dynamic value from at least the first input value 140 and a secret value. The secret value can be a value that is only known to the contactless chip card 110 and the issuer of the contactless chip card 110. In some embodiments, this secret value is used to verify that the contactless chip card 110 actually calculated the dynamic value. In some embodiments the contactless chip card 110 may convert, calculate, or generate 170 the dynamic value from more than just the first input value 140. In these instances, the totality of the data used to convert, calculate, or generate 170 the dynamic value can be known as conversion data. Conversion data can be described as the input that results in the dynamic value output. The dynamic value is, in many embodiments, a unique value calculated for each transaction. The contactless chip card sends 180 the dynamic value to the mobile device 100. Upon receiving 185 the dynamic value from the contactless chip card 110, the mobile device can send authentication data 195 based on the dynamic value to the user 120.

Authentication data 195 is data used by an issuer or other party involved in a transaction to verify the authenticity of the transaction. In some embodiments, the authentication data 195 is merely the dynamic value. In other embodiments, the authentication data 195 includes a representation of the first input value 140. This representation can include the entirety of the first input value 140 or only a portion of the first input value 140.

In other embodiments, the mobile device 100 can generate, calculate, store, receive, or provide a second input value. That second input value can be communicated to the contactless chip card 110 and used in the generation 170 of the dynamic value. The second input value can be a random number, a stored number, or a number generated based on some other data stored by or provided to the mobile device 100. In further embodiments, the authentication data 195 can include a representation of the second input value. That representation can include the entirety of the second input value or only a portion of the second input value. In other embodiments, the mobile device 100 can contain or store a generic applet to perform any functions required in the course of a contactless chip card or device transaction.

In other embodiments, the contactless chip card 110 stores a transaction counter. This transaction counter may be representative of the number of times the contactless chip card 110 has been used to make a transaction. This transaction counter can also be used in the generation 170 of the dynamic value. In other embodiments, the transaction counter can be communicated to the mobile device 100 and the authentication data 195 can include a representation of the transaction counter. That representation can include the entirety of the transaction counter or only a portion of the transaction counter. In further embodiments, the contactless chip card can alter the transaction counter by either increasing or decreasing the transaction counter by a pre-determined value. The pre-determined value can be the value "1" or some other known value.

In further embodiments, the mobile device 100 can request multiple dynamic values from the contactless chip card 110. This can be done by communicating 150 a first input value 140, or many different first input values 140 to the contactless chip card 110 more than one time, each time receiving 185 a dynamic value. For instance, data derived from the first input data 140 or second input data may be passed to the chip card in a data field reserved for the unpredictable number in a number of consecutive card authentication requests.

In further embodiments, the authentication data 195 communicated to the user 120 can be based on these multiple dynamic values. In other embodiments the authentication data 195 can be produced by inputting one or multiple dynamic values, all or part of the first input value 140, and all or part of the second input data into a one way hash function. To the result of this one way hash function, all or part of the transaction counter can be appended to the authentication data 195. Further all or part of the second input value can be appended to the authentication data 195.

In other embodiments, the mobile device 100 has a visual interface such as an LCD screen, an analog electronic display, a digital electronic display, electronic ink, a head-mounted display, or any other output unit that gives a visual representation of data. In further embodiments, the visual interface on the mobile device 100 can display the authentication data 195 or a representation of the authentication data 195.

FIG. 3 depicts an embodiment where a mobile phone is communicating using Near Field Communication with a contactless chip card. The contactless chip card 110 is placed in proximity 320 to the mobile phone 300 sufficient to initiate communication. The mobile phone 300 and contactless chip card 110 can communicate via radio waves 310.

Figure 2:
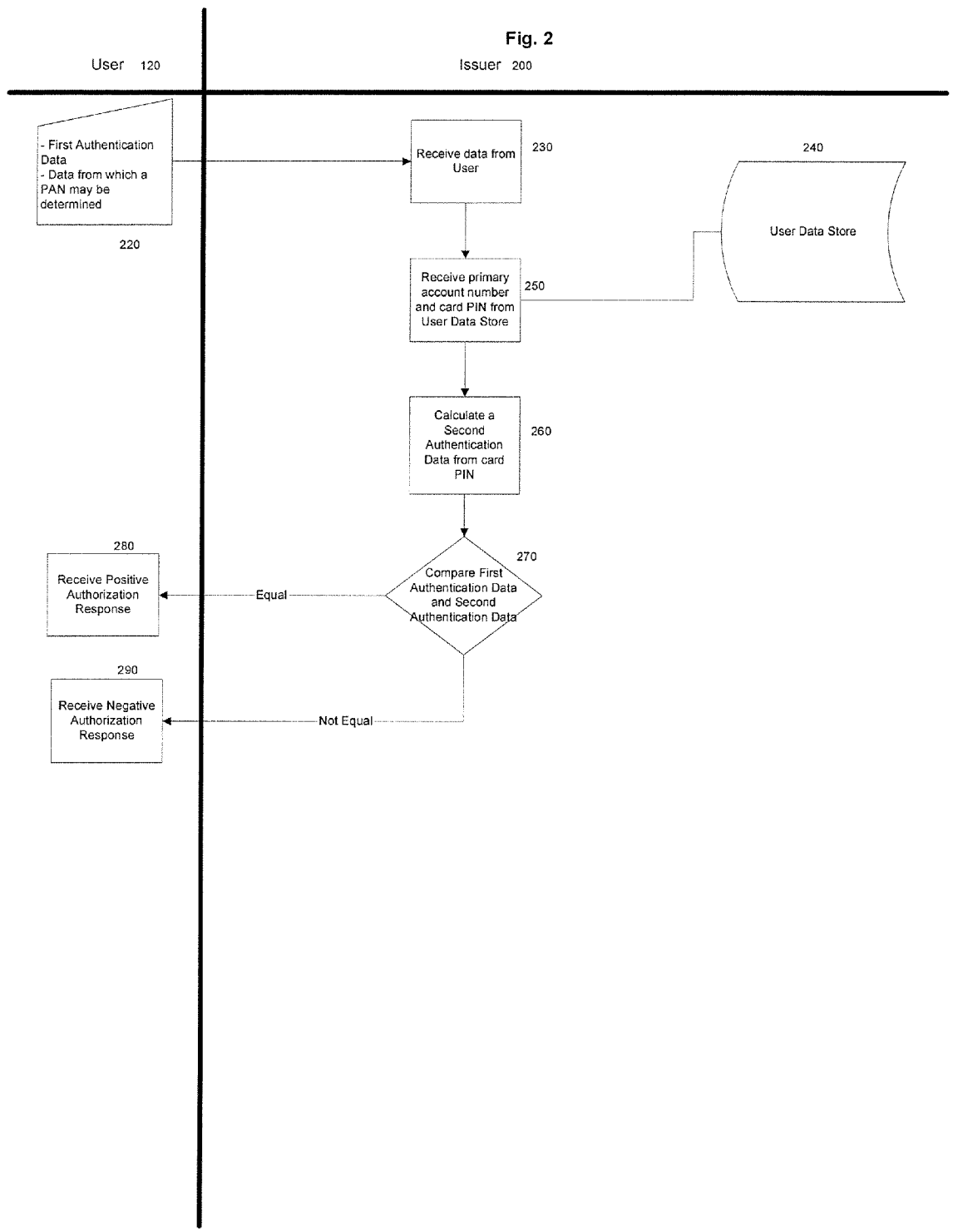
FIG. 2 is a diagram of validating authentication data according to some embodiments of the disclosed subject matter.

FIG. 2 represents an embodiment of the method of validating a transaction. An issuer 200 can be a payment card provider such as a financial institution, or any other entity that can validate a financial transaction, such as a transaction processor. The issuer receives 230 first authentication data 220 and data from which an account number, such as a Primary Account Number (PAN), can be determined. In some embodiments the first authentication data 220 can be the authentication data 195 provided to a user. In some embodiments the first authentication data 220 is used to determine whether a proposed transaction is valid, or authorized by a valid user 120. A PAN is a number that corresponds to a user 120. In exemplary embodiments the data from which a PAN can be determined can be either the PAN itself or some data associated with that PAN such that the PAN itself is never actually communicated. A user data store 240 contains user data entries which are made up of data associated with a PAN and corresponding data associated with a Personal Identification Number (PIN). The user data store 240 can be a database, a mainframe, a hard drive, a flash drive, or any other computer-readable memory medium. The data associated with a PAN stored in the data store 240 can be the actual PAN or a data representation that corresponds with the PAN such that a PAN can be determined or verified. The data associated with the PIN can be the actual PIN or a data representation that corresponds with the PIN such that the PIN can be determined or verified. The issuer 200 receives 250 at least a card PIN from the user data store 240. Second authentication data can be calculated 260 from at least the card PIN. Second authentication data can be used to validate that the first authentication data was calculated or generated by an authorized card holder. The second authentication data is then compared 270 with the first authentication data and a positive 280 or negative 290 response can be provided there from. The comparison 270 may involve determining whether the first authentication data and second authentication data are equal, or whether there is a similarity between them such that the transaction can be deemed valid. When PIN verification is performed, the calculation may be performed in a hardware security module (HSM).

In further embodiments, the user data entries in the user data store 240 can store a last known transaction counter that can be received 250 from the user data store 240 and used in calculating 260 the second authentication data. This last known transaction counter is data concerning either what transaction counter is expected to be used in any calculation of a dynamic value by the contactless chip card 110 or the last transaction counter that was actually used by the contactless chip card 110. In other embodiments, the last known transaction counter stored in the user data store 240 can be advanced or changed by a pre-determined value. This advancing or changing of the last known transaction counter can correspond with any advancing or changing operation that the contactless chip card 110 performs on the transaction counter stored in the contactless chip card 110.

In further embodiments, the user data entries in the user data store 240 can store a secret value, or data from which a secret value can be determined or verified, which can be used by a contactless chip card 110 to calculate a dynamic value. In some exemplary embodiments, the secret value is a symmetric or asymmetric cryptographic key. This secret value, or data from which a secret value can be determined or verified, can be a number or any other piece of data and can be stored in the contactless chip card 110 and the user data entry corresponding to the PAN associated with that contactless chip card at the issuer's location. Alternatively, the secret data may not be stored at the issuer's location, but may instead be derived from other data, such as a master secret key, and data specific to the chip card, and/or the account. This secret value stored in the user data store can be used to calculate 260 the second authentication data. In other embodiments, the user data entries in the user data store 240 can store a template corresponding to the contactless chip card 110 that is associated with the PAN corresponding to the user data entry. This template can be used to format the second authentication data and may determine which data contained in the user data entry to use in calculating 260 the second authentication data.

In further embodiments the first authentication data 220 can contain a representation of a first input data 140, which can constitute a PIN, a challenge, or both a PIN and a challenge. The PIN or challenge can be extracted and used to calculate 260 the second authentication data. In other embodiments, the first authentication data 220 can contain a representation of the second input value, which can be a value generated by a mobile device 100. The second input value can be used to calculate 260 the second authentication data. In further embodiments, the first authentication data can contain a representation of a transaction counter. This transaction counter can be compared to the last known transaction counter or used to calculate 260 the second authentication data.

Most proximity payment, or contactless chip, cards in use today send to the merchant terminals data structures compatible with those conveyed by classical magnetic stripe cards. This allows proximity payment cards to be used with only minimal modifications to the terminal infrastructure.

In that usage model, the terminal sends a request for card authentication to the card, providing the card with a terminal-generated random challenge (UN). It gets in return a cryptographically generated card authentication code (CVC3), or dynamic value, typically computed on data including that UN and a card-stored counter (ATC), or transaction counter, incremented at each transaction.

Before requesting the CVC3, the terminal reads a template from the card, as well as various data elements. This template indicates to the terminal how to format the data elements read from the card to create a suitable image of a magnetic stripe. It contains information about the length of the UN required by the card and about the way card-provided data (CVC3, ATC) should be formatted.

The terminal formats the data according to the templates and uses it to fill the Track Data field of an authorization request. The authorization request is then sent online to the card issuer for authorization. In particular, PayPass implements that model.

Envisaged contactless payment cards, or contactless chip cards, including PayPass, do not support offline PIN validation. For face-to-face (card present) transactions, there is either no use of any PIN, because it does not fit for the contactless fast transaction context, e.g. tollways, mass transit, QSR, etc., or the PIN cannot be validated offline by the card because of the risk of contactless PIN-probing.

In order to allow transparent use of these cards in two-factor authentication mode, the mobile performs a specific handling to include the PIN in the data signed by the card, and therefore, in the authentication token to be validated by the issuer. Hence, no PIN data is sent to the issuer.

The approach to process the PIN in a transaction is as follows: (1) The mobile prompts the cardholder for a PIN. (2) The PIN is combined with a mobile-generated random number and/or with challenge data (if any), and passed as UN in a number of consecutive card authentication requests. The number of such requests actually used depends on a number of parameters, on the capabilities of the card and on security decisions. (3) The CVC3s as sent back by the card in the answer to that command, any part of the PIN digits and of the challenge data not used at the previous step are combined to form the input to the calculation of a one-way hash function. The result from that function is truncated to a suitable length, and form a part of the authentication token. The other parts of the authentication token are the card ATC (truncated according to a card-specified length) and the random number as generated at the previous step. (4) Reference PINs are stored encrypted at the issuer authorization system. This allows for implicit PIN validation at the issuer level, by re-generating an authentication token with the reference PIN and comparing it to the authentication token received from the cardholder.

Figure 4:
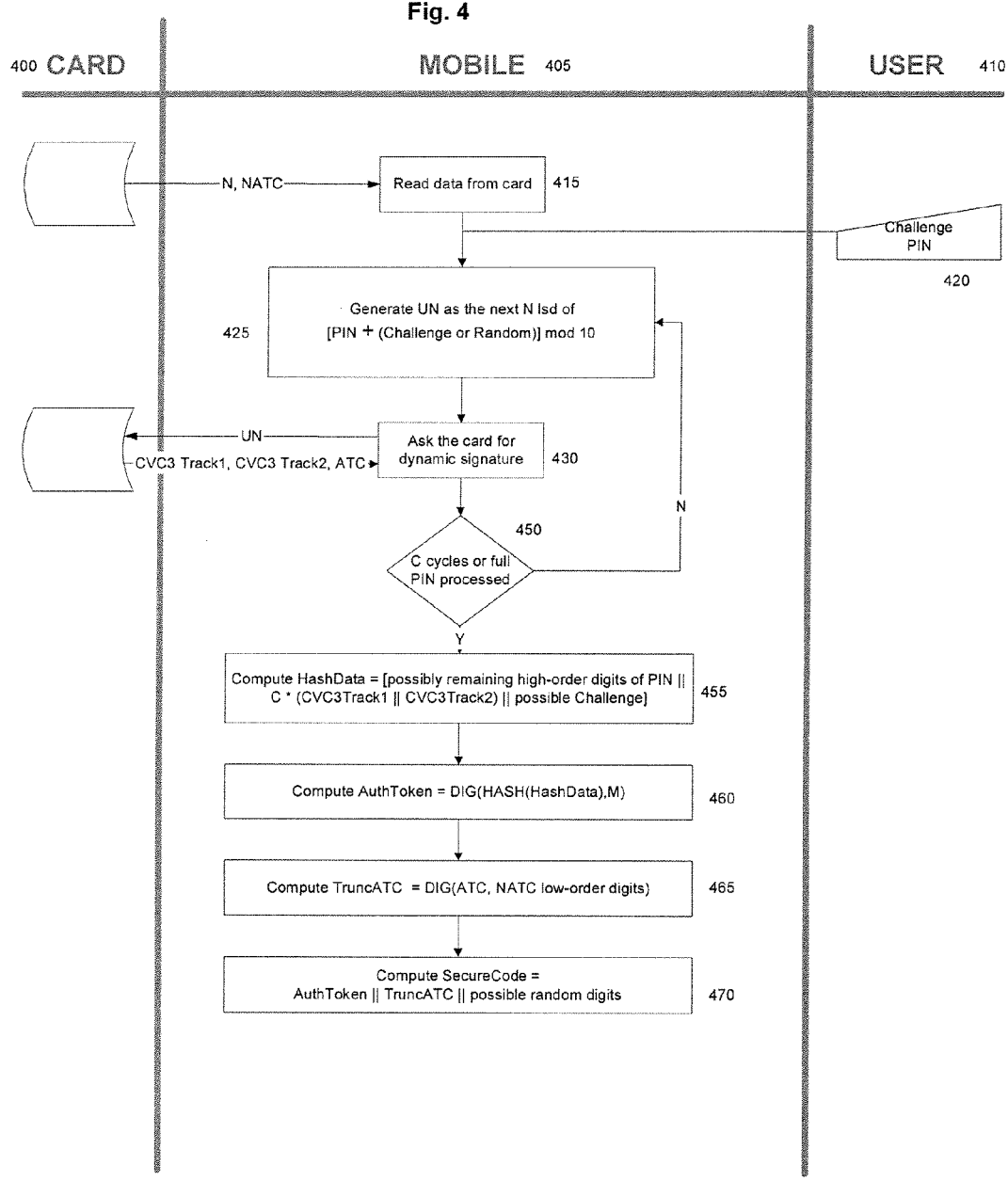
FIG. 4 is a diagram of calculating dynamic authentication data, e.g. a SecureCode, according to some embodiments of the disclosed subject matter.

An embodiment of generating a SecureCode, or authentication data is shown in FIG. 4. A user 410, mobile device 405, and card 400 interact to generate the SecureCode 470. Notation is provided below. Let:

N denote the number of UN digits taken into account in a CVC3 calculation

AC(b) denote the value computed by the card authentication function when no unpredictable number is used and the Application Transaction Counter is b.

AC(a, b) denote the value computed by the card authentication function when the unpredictable number is a and the Application Transaction Counter is b.

C denote the number of times a card may execute the AC function in the course of one single Contactless CAP transaction R denote the number of digits from the challenge (if any) that may be used to hide the PIN in wireless communication M denote the number of digits of the actual authentication token NATC denote the number of ATC digits to be transmitted to the issuer p denote the length (in digits) of the PIN q denote the length (in digits) of the challenge i, k, r, s, t, ATC denote integers RANDOM denote a digit array PIN denote a p-digit array containing the p digits of the PIN CHALLENGE denote a q-digit array containing the challenge provided by the issuer tmp and sc denote digit arrays MIN(a, b) denote the minimum of a and b MAX(a, b) denote the maximum of a and b $\lceil x \rceil$ denotes the smallest integer greater than or equal to x HASH(a) denote binary string resulting from the application of a one-way hash function to a binary string a DIG(a, b) denote the b low-order digits of the decimal representation of binary string a CVC denote an array of CVC3 values sc denote the value of the M+NATC+p−s)-digit array In the embodiment shown in FIG. 4, the mobile device 405 reads data 415 from the card 400. A challenge or pin 420 is sent from the user 410 and an unpredictable number is generated 425 by the mobile. The card 400 is asked 430 for a dynamic signature, or dynamic value, for a plurality of times until 450 a pre-determined set of cycles is reached or the PIN is processed. A HashData is computed 455, from which an Authorization Token is computed 460, then a truncated transaction counter is computed 465, and a SecureCode, or authorization data, is computed 470 by combining the Authorization Token, the truncated transaction counter, and possibly some random digits.

The following algorithm computes a (M+NATC+p−s)-digit SecureCode Cs by requesting a maximum of C card authentication values from a proximity card:

```
k := MIN(C * N, p)
r := MIN(R, q)
s := MIN(r, p)
RANDOM[0..p−s−1] := random digits
if N = 0
then
        t := C−1
        for i := 0 to t do CVC[i] := AC(ATC)
else
        t := ⌈k/N⌉−1
        for i := 0 to s−1 do tmp[i] := PIN[i] + CHALLENGE[i] mod 10
        for i := s to k−1 do tmp[i] = PIN[i] + RANDOM[i−s] mod 10
        tmp[k..⌈k/N⌉*N−1] = 0..0
        for i := 0 to t do CVC[i] := AC(tmp[i*N..(i+1)*N−1], ATC)
sc :=   DIG(HASH(PIN[k..p−1] ‖ CVC[0..t] ‖
        CHALLENGE[s..q−1]), M)
        ‖
        DIG(ATC, NATC)
        ‖
        RANDOM[0..p−s−1]
```

An attacker not in possession of the card cannot perform any attack better than a random guess of a SecureCode, or authentication data. The probability of a success is $10^{-m}$. When an attacker in possession of a stolen card and does not have any information about the related PIN, he may attempt a random guess of a PIN for that card. The probability of a success is $10^{-p}$.

The two considerations above imply that one should have M>=p. They also mean that the issuer should detect any abnormal number of failed ATC validations and take appropriate actions. The risk of PIN disclosure depends on the capabilities of the attacker. An attacker able to capture both the data exchanged between the card and the mobile (UNs, CVC3s), and the data exchanged between the cardholder and the issuer (challenge and/or SecureCode, or authentication data) on another channel may fully determine the cardholder's PIN. When feasible, it is preferable to have a small value for R, as is probably easier to have SecureCode, or authentication data, handled by the cardholder as 'sensitive data' than it is for the challenge. However, small values for R tend to generate longer SecureCodes.

An attacker only able to capture the data exchanged between the cardholder and the issuer (challenge and/or SecureCode) will not get any information on the PIN when p<=C*N. When p>C*N, that is, when the PIN cannot be fully used in CVC3 computation by the card, information about the PIN will leak in the SecureCode, as the attacker may use exhaustive search to attack the PIN. The efficiency of such an attack will depend on the size of the CVC3 data (the larger it is, the less efficient the attack will be). Also, PIN leakage reduces when p−C*N decreases. Hence it is preferable to have either p<=C*N or small p−C*N.

An embodiment of validating a SecureCode, or authorization data, is depicted in FIG. 5. The issuer 505 receives a SecureCode, or authentication data, and user ID 515 from the user 500. The issuer 505 must determine the Primary Account Number (PAN) of the card, or any other suitable data unambiguously identifying the card, based on the user ID, or identification data, 515 provided by the user 550, which could be a customer (for e-banking) or by the merchant (for 3 D-Secure e-commerce). Beginning the validation process 520, an associated User ID-PAN, challenge and card CAP personal data are received from a database 510. The mobile-generated random digits are extracted 525 from the SecureCode. The truncated transaction counter is extracted from the SecureCode and a last known transaction counter is received from the database 510 to determine 530 the full transaction counter. The PIN is received from the database 510, and an unpredictable number is built 535. The dynamic values, or CVC3 Track 1 and CVC3 Track2 data, is generated using the card keys, or secret values, stored in the database 510. The generation of the dynamic values, or CVC3 Track 1 and CVC3 Track2 data, repeats 545 for a set number of iterations or until the PIN is fully processed. A HashData is generated 550 from certain digits of the PIN, the dynamic values, or CVC3 Track 1 and CVC3 Track2 data, and possibly the challenge. A validation authentication token is generated 555 from the HashData. An authentication token is extracted 560 from the SecureCode, or authentication data, and compared 565. If the validation authentication token and the authentication token are equal, then the transaction is successful 570, otherwise it is a failure 575.

In one embodiment, the PayPass system can be used. In the particular case of PayPass, the following parameters will be typically used:
M=6
N=8, as PayPass cards use a 4-byte UN
p=4
C=1
R=4
NATC and q left to the discretion of the issuer
AC(a, b) is implemented through use of the Compute Cryptographic Checksum (CCC) command.

Use of the values above leads to the following simplified version of the generic algorithm.

```
s := MIN(4, q)
RANDOM[0..3−s] := random digits
for i := 0 to s−1 do tmp[i] := PIN[i] + CHALLENGE[i] mod 10
for i := s to 3 do tmp[i] = PIN[i] + RANDOM[i−s] mod 10
tmp[4..7] = 0..0
CVC[0] := CCC(tmp[0..7], ATC)
sc := DIG(HASH(CVC[0] ‖ CHALLENGE[s..q−1]), 6) ‖
      DIG(ATC, NATC) ‖ RANDOM[0..3−s]
```

Note that PayPass cards return a 4-byte CVC3 (actually made of a 2-byte CVC3 corresponding to magnetic stripe track 1 data and a second 2-byte CVC3 corresponding to magnetic stripe track 2 data). Hence CVC[0] is a 4-byte value. Note also that when s=q there is no need to use the HASH function.

FIG. 6 depicts the flow of logical events for that PayPass implementation of contactless CAP. A PayPass card 600 can communicate with a Mobile or NFC reader 605. A user 610 sends 615 an authentication request to the mobile or NFC reader 605 and a challenge is displayed 615. On the mobile or NFC reader 605, a M-CAP application can be selected from the mobile directory system 620. The mode can be selected 625, as well as the product 630, and an optional challenge can be entered 635 into the mobile or NFC reader 605. The PIN can also be entered 640. Data is exchanged between the mobile or NFC reader 605 and the PayPass card 600. An unpredictable number is built 645 and sent with optional data to the PayPass card 600 wherein a CVC3 Track 1, CVC3 Track2, and transaction counter are received by the mobile or NFC reader 605. A SecureCode is generated 650 by the mobile or NFC reader 605 and displayed 655 to the user 610, who then enters the SecureCode 660.

In an example of this embodiment, let us assume a PayPass card is personalized as follows: PIN='7379', ATC='171', NATC='2'. Let us also assume that the typical parameters as described above are used for the algorithm. Let us assume the challenge sent by the issuer is Challenge='1562', and q='4'. Then, the following steps are performed:

- no random digit is generated as p=q (i.e. s=0)
- The phone sends a CCC command to the card, with UN= ['1562'+'7379'] mod 10='8831'
- The phone receives from the card two CVC3 whose concatenated values give, say, value 0 xF42386A2, which decimal value is 4095968930
- The phone truncates that value to 6 low-order digits, resulting in value '968930'
- The phone truncates the ATC to 2 digits, resulting in value '71'
- The phone computes the SecureCode as '96893071'

Although various exemplary embodiments are described herein, various modifications known to persons of ordinary skill in the art can be made without depicting from the scope of the invention, which is intended to be defined only by the appended claims. Additionally, the inventors do not intend to disclaim any embodiments discussed herein.

We claim:

1. A method of generating authentication data for use in a transaction comprising:
   providing a contactless chip device associated with at least one authorized user having pre-stored secret data, configured to communicate with an unsecure mobile device;
   receiving a first input value into said mobile device;
   detecting said contactless chip device in proximity to said mobile device and thereafter beginning communication between said contactless chip device and said mobile device;
   communicating data derived from said first input value from said mobile device to said contactless chip device;
   receiving a dynamic value derived from said first input value and said pre-stored secret data from said contactless chip device sufficient to validate the involvement in said transaction of said at least one authorized user at said mobile device without receiving said pre-stored secret data at said mobile device;
   after said communicating said dynamic value, detecting that said contactless chip device has been removed from being in proximity to said mobile device, thereby preventing further communication between said contactless chip device and said mobile device; and
   communicating authentication data based at least in part on said dynamic value to a user of said mobile device.

2. The method of claim 1 further comprising said mobile device generating a second input value, said mobile device communicating said second input value to said contactless chip device, and said dynamic value further derived from said second input value.

3. The method of claim 2 wherein said authentication data further comprises a representation of at least part of said second input value.

4. The method of claim 1 wherein said dynamic value is further derived from a transaction counter stored on said contactless chip device.

5. The method of claim 4 wherein said transaction counter advances by a predetermined value in response to said derivation of said dynamic value.

6. The method of claim 4 wherein said authentication data further comprises a representation of at least part of said transaction counter.

7. The method of claim 1 wherein said first input value comprises a PIN.

8. The method of claim 7 wherein said first input value further comprises a challenge number.

9. The method of claim 7, wherein said secret data comprises a cryptographic key.

10. The method of claim 1 wherein said authentication data further comprises a representation of at least part of said first input value.

11. The method of claim 1 wherein said mobile device is a mobile phone capable of Near Field Communication.

12. The method of claim 1 wherein said mobile device comprises a visual interface and said communicating said authentication data comprises displaying said authentication data on said visual interface.

13. The method of claim 1, wherein said authentication data comprises an authentication token.

14. A method of operating a mobile device to generate authentication data for use in a transaction comprising:
   operating said mobile device in accordance with a first mode of operation wherein said mobile device is capable of permitting voice communication between a user of said mobile device and a third party; and
   operating said mobile device in accordance with a second mode of operation in response to a command, said second mode of operation comprising:
     receiving a first input value;
     communicating data derived from said first input value to a contactless chip device associated with at least one authorized user storing secret data via near field communication;
     receiving a dynamic value derived from said secret data and said data derived from said first input value from said contactless chip device without receiving said secret data from said contactless chip device, the dynamic value being sufficient to validate the involvement in said transaction of said at least one authorized user; and
     communicating authentication data based at least in part on said dynamic value to a user of said mobile device.

15. The method of claim 14, wherein said first input value is a PIN.

16. The method of claim 14, wherein said first input value is a challenge number.

17. The method of claim 14, wherein said communication authentication data comprises displaying authentication data to a user via a display device.

18. An unsecure mobile device for generating authentication data, comprising:
   a data entry device capable of receiving data from a user;
   a communications device capable of communicating with a contactless chip device associated with at least one authorized user;
   a display capable of displaying data to a user; and a processor programmed with instructions having functionality for:
  receiving a first input value from said data entry device;
  communicating data derived from said first input value to a contactless chip device storing secret data and receiving a responsive dynamic value calculated using said secret data and said data derived from said first input value without receiving said secret data from said contactless chip device, said dynamic value being sufficient to validate the involvement in said transaction of said at least one authorized user; and
  communicating authentication data based at least in part on said responsive dynamic value via said display.

19. The mobile device of claim 18, wherein said first input value is a PIN.

20. The mobile device of claim 18, wherein said first input value is a challenge number.

21. The mobile device of claim 18, further comprising:
a microphone;
a speaker;
a transceiver in electrical communication with said microphone and said speaker, capable of receiving and transmitting signals for voice communication.

* * * * *